United States Patent [19]
Perkins et al.

[11] 3,718,054
[45] Feb. 27, 1973

[54] LOAD RESPONSIVE TORQUE TRANSMISSION MECHANISM

[75] Inventors: Ralph W. Perkins, Russell L. Morden, both of Lansing, Mich.

[73] Assignee: General Motors Corporation, Detroit, Mich.

[22] Filed: Oct. 7, 1971

[21] Appl. No.: 187,455

[52] U.S. Cl............................74/751, 74/789
[51] Int. Cl............................F16h 5/54, F16h 57/10
[58] Field of Search..............................74/751

[56] References Cited

UNITED STATES PATENTS

| | | | |
|---|---|---|---|
| 1,311,236 | 7/1919 | Kittredge | 74/751 |
| 1,541,267 | 6/1925 | Kittredge | 74/751 X |
| 2,064,646 | 12/1936 | Baule | 74/751 |
| 3,241,630 | 3/1966 | Snabes et al. | 74/751 X |
| 3,257,877 | 6/1966 | Ulrich et al. | 74/751 X |

*Primary Examiner*—Charles J. Myhre
*Assistant Examiner*—Thomas C. Perry
*Attorney*—W. E. Finken et al.

[57] ABSTRACT

A load responsive torque transmission mechanism adapted to normally transfer torque at a unitary ratio and to automatically shift to a higher transmission ratio when the applied torque exceeds a predetermined minimum magnitude, the mechanism including an input shaft, an output shaft, a planetary gear train disposed therebetween, a pawl supported on the output shaft for unitary rotation therewith and for radial movement relative thereto between an extended position seated in a groove in the input shaft and directly coupling the input and output shafts and a retracted position, a plurality of spherical rolling elements disposed about the output shaft on opposite sides of the pawl such that radial movement of the latter effects lateral movement of the rolling elements, and cams associated with the rolling elements responsive to lateral movement thereof to impart thereto an axial component of motion. When excessive torque is applied to the input shaft the pawl is cammed out of the groove and the concurrent axial motion of the rolling elements actuates a plurality of lock pins which ground the planet carrier of the planetary gear train thereby to establish torque transmission through the gear train at a ratio exceeding unity.

4 Claims, 8 Drawing Figures

INVENTORS.
Ralph W. Perkins &
BY Russell L. Morden
Saul Schwartz
ATTORNEY

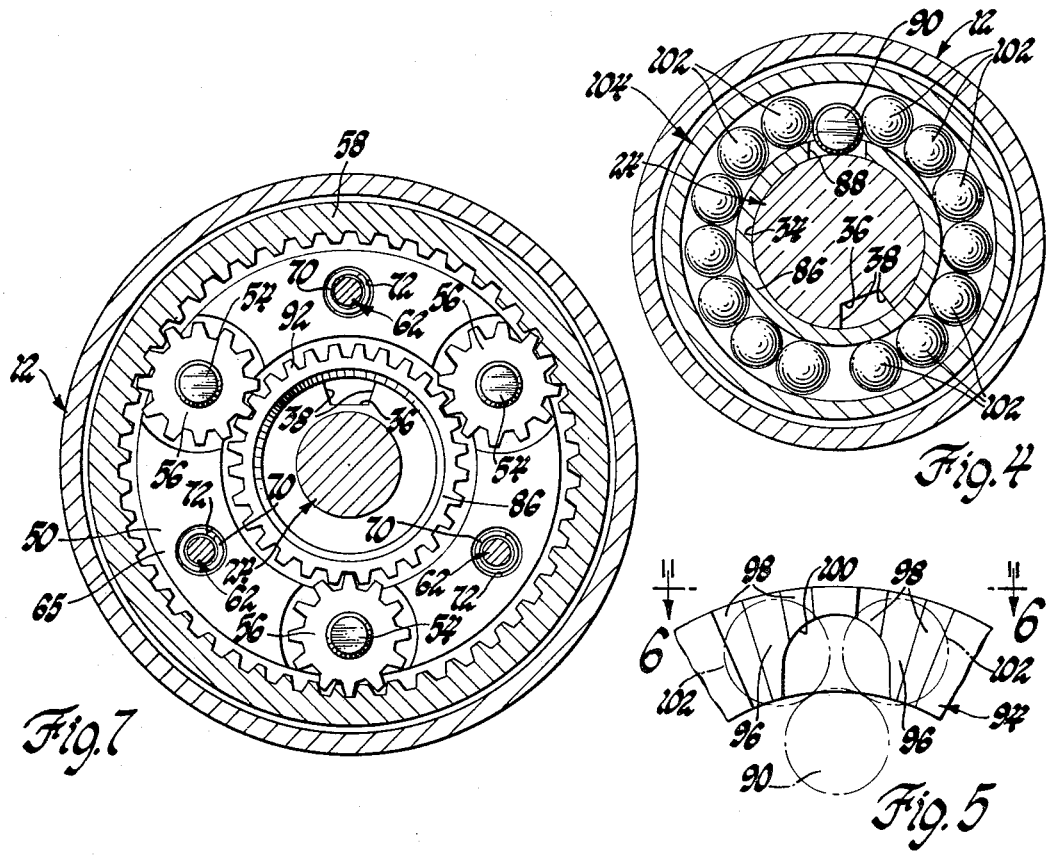
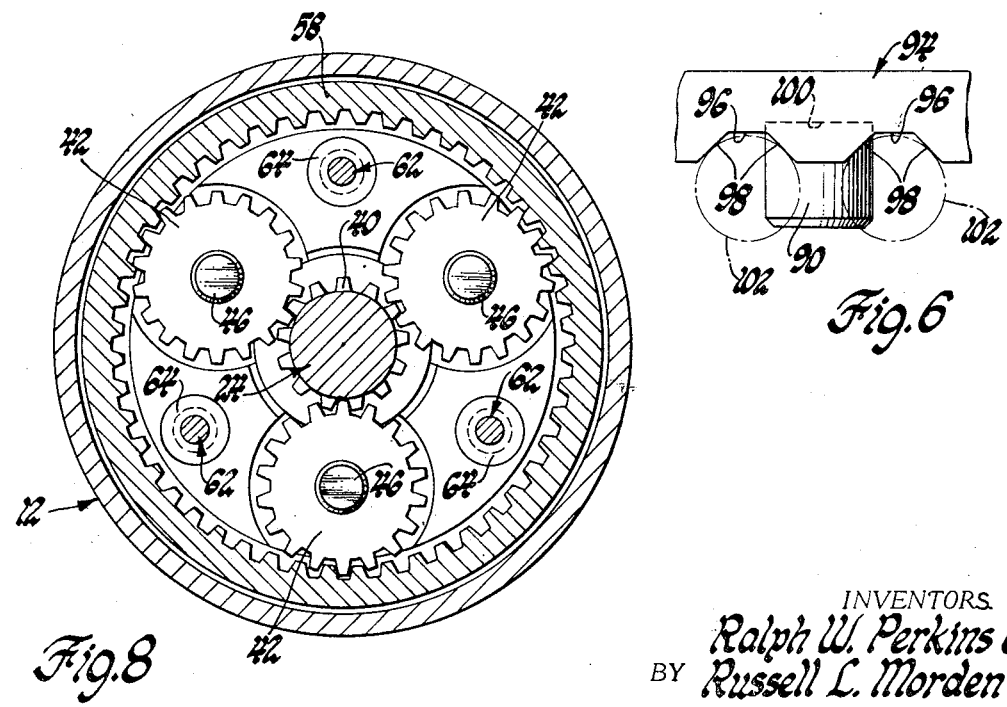

LOAD RESPONSIVE TORQUE TRANSMISSION MECHANISM

This invention relates generally to a mechanism for mechanically transferring torque from one rotating shaft to another and in particular to such a mechanism wherein the transmission ratio is automatically changeable.

In copending application Ser. No. 131,267, filed on Apr. 5, 1971 in the name of R. L. Morden et al. and assigned to the assignee of this invention, there is disclosed a torque responsive transmission mechanism wherein the transmission ratio of the mechanism is automatically changeable in response to the magnitude of the torque input. Such mechanisms are, of course, particularly adapted for incorporation into vehicle power steering systems featuring low steering gear ratios, the mechanism functioning to increase the gear ratio of the steering system in the event of power failure. A torque responsive transmission mechanism according to this invention represents an improvement over the mechanism disclosed in the aforementioned Morden et al. application and other known devices having similar performance characteristics.

The primary feature of this invention is that it provides an improved torque transmission mechanism particularly adapted for use in automotive steering systems which are characterized by low steering gear ratios. Another feature of this invention is that it provides an improved transmission mechanism wherein the torque transmission ratio between an input shaft and an output shaft automatically increases when the torque applied to the input shaft exceeds a predetermined minimum magnitude. Still another feature of this invention resides in the provision in the transmission mechanism of automatic ratio changing means including a pawl supported on the output shaft for rotation therewith and for radial bodily movement relative thereto between a retracted position and an extended position directly coupling the input and output shafts, first cam means on the input shaft adapted to cam the pawl from the extended to the retracted position under conditions of high torque input, and second cam means on the output shaft associated with a plurality of connecting elements adapted for lateral and axial bodily movement in response to radial movement of the pawl from the extended to the retracted position, the axial motion component of the connecting elements being operative to activate a planetary gear set between the input and output shafts for increasing the torque transmission ratio therebetween. A still further feature of this invention resides in the provision of connecting elements in the form of a plurality of spheres disposed on opposite sides of the pawl such that radial bodily movement of the latter forces the spheres laterally, each sphere thereupon engaging a cam surface of the second cam means which imparts thereto an axial component of bodily movement.

These and other features of this invention will be readily apparent from the following specification and from the drawings wherein:

FIG. 4 is a sectional view similar to FIG. 3 but showing the pawl in its retracted position;

FIG. 5 is an enlarged view of a portion of FIG. 3 showing a portion of the second cam means;

FIG. 6 is a view taken generally along the plane indicated by line 6—6 in FIG. 5 and showing a development of the second cam means;

FIG. 7 is a sectional view taken generally along the plane indicated by line 7—7 in FIG. 2; and FIG. 8 is a sectional view taken generally along the plane indicated by line 8—8 in FIG. 2.

Figure 1:
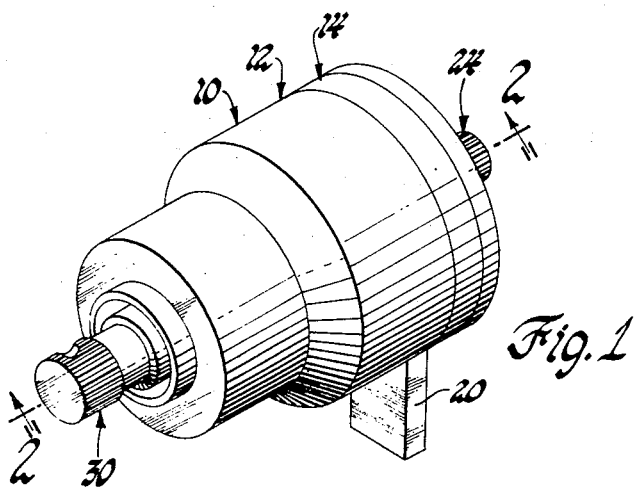
FIG. 1 is a perspective view of a transmission mechanism according to this invention.
Figure 2:
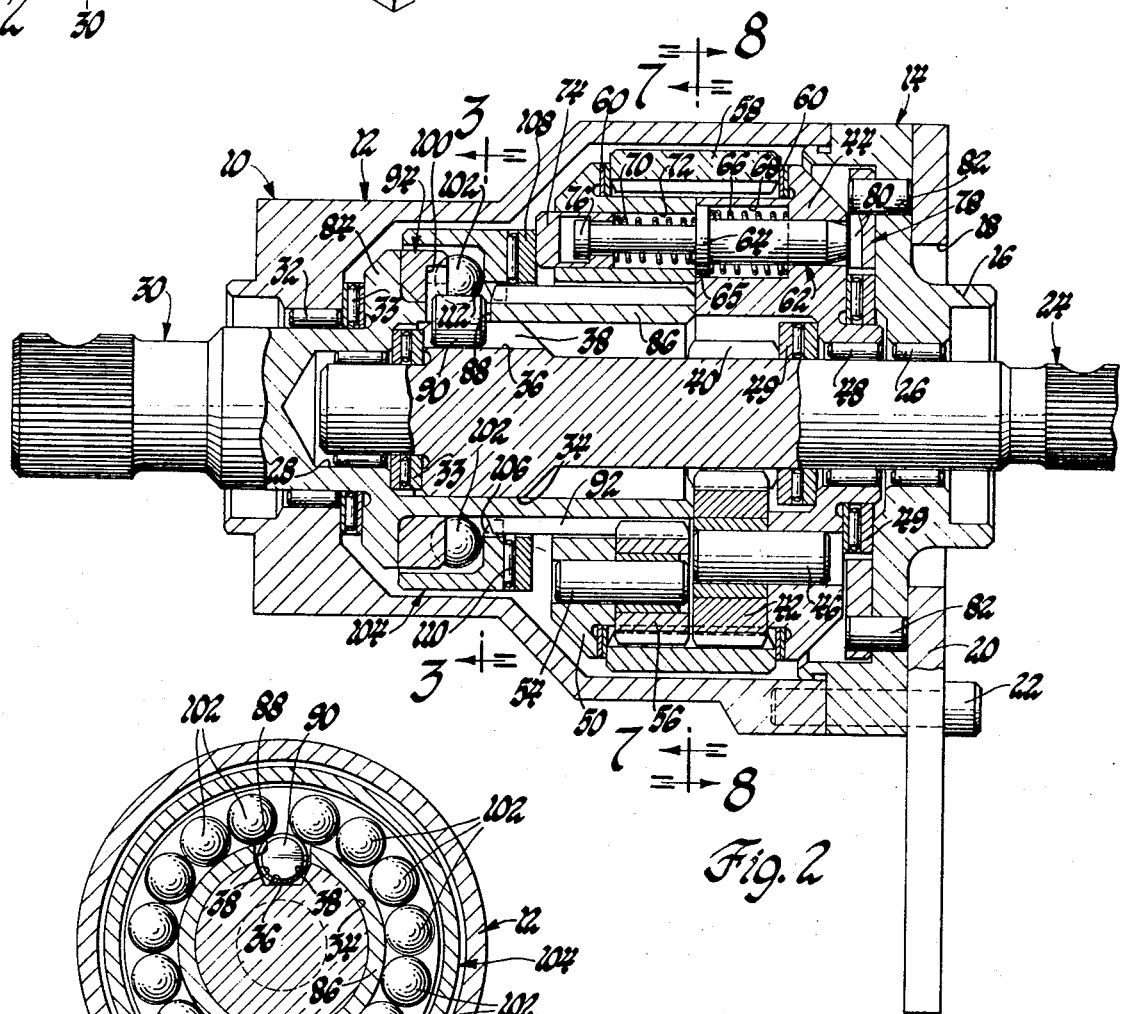
FIG. 2 is an enlarged partially broken away sectional view taken generally along the plane indicated by lines 2—2 in FIG. 1.

Referring now to FIGS. 1 and 2 of the drawings, there shown is a torque transmission mechanism according to this invention designated generally 10 including a generally cylindrical housing 12 having one end closed by an end plate 14. A neck portion 16 of the end plate 14 projects through an aperture 18 in a support plate 20, the support plate being rigidly attached to the end plate by a plurality of cap screws 22. The support plate 20 functions to maintain the housing 12 and end plate 14 stationary with respect to the structure on which the transmission mechanism is mounted and it will be understood that the support plate is merely a schematic representation of any appropriate support means as, for example, the conventional toe plate of an automobile vehicle body when the transmission mechanism 10 is incorporated into the steering system of the vehicle.

As seen best in FIG. 2, an input shaft 24 is rotatably supported on the end plate 14 by a plurality of roller bearings 26 and is rotatably piloted in a bore 28 in an output shaft 30, the output shaft being rotatably supported in axial alignment with the input shaft on the housing 12 by a plurality of roller bearings 32. The input and output shafts are maintained axially stable by a plurality of thrust bearings 33. The input shaft 24 has formed thereon adjacent the end piloted in the output shaft 30 a cylindrical bearing surface 34 with an axially extending notch or keeper 36 having angularly disposed sides 38. Generally midway between the ends thereof the input shaft 24 has formed thereon a plurality of gear teeth defining an input sun gear 40.

The input sun gear 40 meshingly engages a set of input planet gears 42 each rotatably supported on a first planet carrier section 44 by a corresponding number of dowel pins 46, the first carrier section 44 being rotatably supported on the input shaft 24 by a plurality of roller bearings 48. A pair of thrust bearings 49 axially stabilize the first planet carrier section and cooperate with thrust bearings 33 in further stabilizing the input and output shafts.

As best seen in FIGS. 2 and 7, a second planet carrier section 50 is rigidly attached to the first planet carrier section 44 by a plurality of bolts, not shown, and rotatably supports on a trio of dowel pins 54 a set of output planet gears 56. Both the output and input planet gears meshingly engage and rotatably support within the housing 12 a ring gear 58. Concentricity between the ring gear 58 and the input shaft 24 is maintained by the planet gear sets while the axial position of the ring gear with respect to the rigidly connected first and second planet carrier sections is maintained by a pair of thrust bearings 60 disposed on opposite sides of the ring gear.

Referring particularly now to FIGS. 2, 7 and 8, a trio of lock pins 62 are supported on the rigidly joined first and second planet carrier sections for rotation as a unit therewith and for axial bodily shiftable movement relative thereto. Each lock pin has a rigid annular abutment ring 64 thereon which seats against a shoulder 65 on the second planet carrier section 50 to limit the leftward axial movement of the lock pin and against which seats one end of a coil spring 66, the other end of the spring being seated against the bottom of a counter bore 68 in the first planet carrier section 44 so that within a lock pins are resiliently urged leftwardly, FIG. 2. A second spring 70 disposed around the lock pin within a bore 72 in the second planet carrier section 50 seats at one end against the opposite side of annular abutment 64 and at the other end against a cap 74 supported on the lock pin for bodily shiftable movement relative thereto and retained thereon by a head portion 76 of the lock pin. The second spring 70 is somewhat stronger than the first spring 66 so that when the cap 74 is depressed the lock pin 62 is bodily shifted rightwardly against the first spring 66.

A locking plate 78 having a plurality of notches 80 therein adapted to captively receive the right end of the lock pins is rigidly attached to the end plate 14 by a plurality of dowel pins 82. When the caps 74 on the lock pins are depressed, each is forced rightwardly into one of the notches 80 registering therewith thereby grounding the rigidly connected first and second planet carrier sections to the end plate 14 to prevent rotation of the carrier sections.

Figure 3:
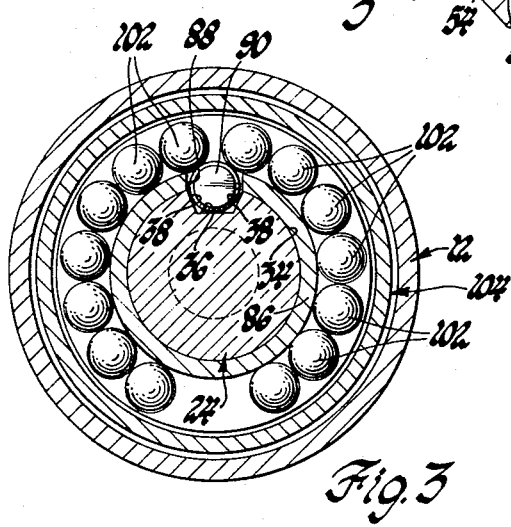
FIG. 3 is a sectional view taken generally along the plane indicated by line 3—3 in FIG. 2 and showing the pawl in its extended position.

Referring now to FIGS. 2, 3 and 4, the output shaft 30 includes an annular flange 84 and a cylindrical end portion 86 extending perpendicularly to the flange. The end portion 86 closely and rotatably receives therewithin the cylindrical bearing surface 34 of the input shaft. As seen best in FIG. 2, the end portion 86 has formed therein a generally square aperture 88 which is adapted to register with the notch 36 in the bearing surface 34 on the input shaft. A pawl in the form of a cylindrical roller 90 is relatively closely disposed in the aperture 88 for rotation as a unit with the output shaft and for generally radial bodily movement relative thereto between an extended position, FIG. 3, wherein the pawl is situated simultaneously in both the notch 360 and the aperture 88 and a retracted position, FIG. 4, wherein the pawl is disposed in the aperture 88 remote from the notch 36. As seen best in FIG. 3, when the pawl is in the extended position thereof it functions to directly couple the input and the output shafts for transmission of torque at a unitary transmission ratio. As seen best in FIG. 4, when the pawl is in the retracted position thereof, the coupling between the input and output shafts is terminated and each is free to rotate relative to the other.

Referring now to FIGS. 2 and 7, the end portion 86 of the output shaft outboard of aperture 88 has formed thereon a plurality of external gear teeth defining an output sun gear 92. The output sun gear meshingly engages each of the output planet gears so that when the pawl 90 is in the retracted position thereof and the lock pins 62 engage notches 80 to ground the planet carrier sections, torque transmission is effected from the input shaft to the output shaft at a ratio exceeding unity through the input sun gear 40, the input planet gears 42, the ring gear 58, the output planet gears 56, and the output sun gear 92.

Referring now to FIGS. 2 through 6, torque responsive clutch means are incorporated into the transmission mechanism according to this invention to effect automatic change of the torque transmission ratio from unity to the higher ratio whenever the torque input at the input shaft 24 exceeds a predetermined minimum magnitude. The clutch means includes, along with the sides 38 of the notch 36 which define first cam means, an annular cam member 94 rotatably disposed about the end portion 86 of the output shaft in abutting engagement with the annular flange 84 on the latter. The cam member 94 has a plurality of internal gear teeth, not shown, matching the teeth of the output sun gear 92 thus enabling the cam member to be slipped axially over the end of the output shaft. As seen best in FIGS. 5 and 6, the cam member 94 has a plurality of generally radially extending V-shaped grooves 96 in the face thereof opposite the face engaging annular abutment 84. Each V-shaped groove has a pair of sides 98 which define second cam means which cooperate with the first cam means as described hereinafter to effect automatic ratio change. The cam member 94 further includes a downwardly opening generally semi-circular notch 100 adapted to receive a portion of the pawl 90 when the latter is in the retracted position thereof, FIG. 4.

The clutch means further includes a plurality of spherical rolling elements 102 disposed around the end portion 86 of the output shaft on opposite sides of the pawl 90, each of the rolling elements being seated in one of the V-shaped grooves 96 in the cam member 94 so that the latter is, in effect, self-centered with respect to the pawl. Each of the rolling elements abuts the rolling elements on the opposite sides thereof and, in the case of the two end elements, the pawl 90. A cylindrical cam follower 104 is disposed around the rolling elements 102 for radial retention of the latter and has a plurality of internal teeth 106 in sliding spline-like engagement with the teeth of the output sun gear 92. A large washer 108 is rotatably disposed around the teeth of the output sun gear 92 in abutting engagement with the caps 74 on the lock pins 62. The washer 108 is separated from the follower 104 by a plurality of thrust bearings 110 which transmit axial forces between the follower and the caps while dissipating relative rotation between the follower and the rigidly connected planet carrier sections Accordingly, when the pawl 90 moves from the extended to the retracted position thereof the rolling elements on opposite sides of the pawl are displaced laterally in opposite directions to make room for the pawl. In moving laterally, however, each of the rolling elements engages one of the sides 98 of the grooves 96 in the cam member 94 which sides impart to each rolling element a rightward, 104 2, axial component of bodily motion. As each rolling element moves rightwardly it engages a surface 112 on the follower 104 causing the latter to also move rightwardly and simultaneously depress the caps 74 on the lock pins to effect grounding of the planet carrier sections, as described hereinbefore, whereupon torque is transferred from the input shaft to the output shaft through the planetary gear sets.

In a typical automotive application wherein the transmission mechanism 10 is incorporated into the vehicle power steering system with the input shaft 24 connected to the vehicle steering wheel and the output shaft 30 connected to the vehicle steering gear, it is desired that the torque transmission ratio between the input and output shafts normally be unity to take advantage of the low steering gear ratio which requires relatively few turns of the steering wheel to effect movement of the steerable road wheels from one extreme position to the other. Accordingly, the first and second springs 66 and 70 are calibrated to impart to the cam follower 104 an axial load sufficient to maintain each of the rolling elements 102 centered in the corresponding one of the grooves 96 in the cam member 94. Thus centered, the rolling elements adjacent the pawl 90 maintain the latter under a predetermined resilient preload in the extended position thereof, FIG. 3, directly coupling the input and the output shaft. Concurrently, of course, the lock pins 62 are withdrawn to within the first and second planet carrier sections so that the sections are freely rotatable within the housing 12. Therefore, when torque is applied to the input shaft the output shaft rotates as a unit therewith as does the entire planetary gear train.

When a power failure occurs in the vehicle terminating the power assist to the steering gear the torque input to the latter required to effect steering maneuvers increases substantially. Accordingly, the operator exerts increased torque on the steering wheel to control the direction of the vehicle, which torque is applied to the input shaft 24. When the magnitude of the applied torque exceeds a predetermined minimum magnitude dependent upon the compressability of the first spring 66 and the angle of inclination of the sides 38 of notch 36, one of the sides 38 of the notch 36 in the input shaft cams the pawl 90 from the extended to the retracted position thereof against the opposing force generated thereon by the spring through the cam follower and the rolling elements. As the pawl 90 moves from the extended to the retracted position thereof the rolling elements are displaced laterally and axially causing depression of the caps 74 through the cam follower 104, the thrust bearings 110, and the washer 108.

If, at the instant the caps are depressed, the lock pins 62 are in register with corresponding ones of the notches 80 in the locking plate 78, the lock pins project into the notches to ground the connected first and second planet carrier sections and thereby establish torque transmission from the input shaft to the output shaft through the planetary gear set at a higher transmission ratio. Once such a path is established the operator can effect steering maneuvers without having to exert unduly large forces on the steering wheel. If, at the instant the caps 74 are depressed, the lock pins 62 are not in register with the notches 80 on the lock plate, the lock pins are held in their normal positions by the lock plate with the second springs 70 compressed until registry is achieved whereupon the springs 70 project the lock pins into the notches to effect grounding of the first and second planet carrier sections. So long as torque of substantial magnitude is being transmitted through the planetary gear set the lock pins 62 will be frictionally maintained in the notches 80 thereby eliminating the tendency of each element of the clutch means to revert back to the preloaded direct couple position each time the notch 36 on the input shaft registers with aperture 88 in the end portion 86 of the output shaft.

Having thus described the invention what is claimed is:

1. In a torque transmission mechanism adapted to normally effect torque transfer between a rotating input shaft and a rotating output shaft at a unitary transmission ratio and to automatically shift to a higher transmission ratio in response to torque input exceeding a predetermined minimum magnitude, said mechanism further including a stationary housing and a normally inactive planetary gear set disposed therein between said input and said output shafts and said planetary gear set including one element adapted for rigid connection to one of said housing and said input shaft to effect torque transmission through said planetary set, a torque responsive clutch system comprising, means defining a keeper on said input shaft, pawl means disposed on said output shaft for unitary rotation therewith and for generally radial bodily movement relative thereto between an extended position engaging said keeper to directly couple said input and said output shafts for unitary ratio torque transfer and a retracted position remote from said keeper permitting relative angular movement between said input and said output shafts, spring means urging said pawl means toward the extended position thereof, cam means on said input shaft responsive to application of torque to said input shaft of magnitude exceeding a predetermined minimum magnitude to shift said pawl means against said spring means from the extended to the retracted position thereof, a pair of coupling elements disposed on said output shaft on opposite sides of said pawl and adapted to be engaged by the latter during movement from the extended to the retracted position and bodily shifted laterally relative thereto, second cam means associated with said coupling elements adapted to engage said coupling elements during lateral movement thereof and to impart thereto an axial component of bodily motion, lock means disposed on said one rigidly connectable planetary gear set element and adapted for movement between an unlocked position and a locked position rigidly connecting said one element to said one of said housing and said input shaft, and means connecting said coupling elements to said lock means responsive to the axial motion component of said coupling elements to move said lock means from the unlocked to the locked position thereof.

2. In a torque transmission mechanism adapted to normally effect torque transfer between a rotating input shaft and a rotating output shaft at a unitary transmission ratio and to automatically shift to a higher transmission ratio in response to torque input exceeding a predetermined minimum magnitude, said mechanism further including a stationary housing and a normally inactive planetary gear set disposed therein between said input and said output shafts and said planetary gear set including one element adapted for rigid connection to one of said housing and said input shaft to effect torque transmission through said planetary set, a torque responsive clutch system comprising, means defining a keeper on said input shaft, pawl means disposed on said output shaft for unitary rotation therewith and for generally radial bodily movement relative thereto between an extended position engaging said keeper to directly couple said input and said output shafts for unitary ratio torque transfer and a retracted position remote from said keeper permitting relative angular movement between said input and said output shafts, a plurality of spherical rolling elements disposed around a portion of said output shaft on opposite sides of said pawl means, each of said rolling elements being in contact with the ones of said plurality of rolling elements on opposite sides thereof and the two of said rolling elements situated adjacent opposite sides of said pawl means being engageable by the latter during movement thereof from the extended toward the retracted position thereby to effect lateral movement of each of said rolling elements relative to said pawl means, cam means associated with said rolling elements and engageable on each of said rolling elements during lateral movement of each to impart thereto an axial component of bodily movement, lock means disposed on said one rigidly connectable planetary gear set element and adapted for axial bodily movement between an unlocked position and a locked position rigidly connecting said one element to said one of said housing and said input shaft, spring means between said lock means and said one element biasing the latter toward the unlocked position thereof, means establishing a connection between said lock means and said rolling elements whereby the axial motion component of the latter effects movement of said lock means from the unlocked to the locked position and whereby the bias imposed on said lock means urges said rolling elements to the positions thereof corresponding to the extended position of said pawl means so that the latter is thereby resiliently biased toward the extended position thereof, and cam means on said input shaft responsive to application of torque to said input shaft of magnitude exceeding a predetermined minimum magnitude to shift said pawl means against said spring means from the extended to the retracted position thereof.

3. In a torque transmission mechanism adapted to normally effect torque transfer between a rotating input shaft and a rotating output shaft at a unitary transmission ratio and to automatically shift to a higher transmission ratio in response to torque input exceeding a predetermined minimum magnitude, said mechanism further including a stationary housing and a normally inactive planetary gear set disposed therein between said input and said output shafts and said planetary gear set including one element adapted for rigid connection to one of said housing and said input shaft to effect torque transmission through said planetary set, a torque responsive clutch system comprising, means defining a cylindrical bearing surface on said input shaft having an axial groove therein the opposite sides of which define a pair of cam surfaces, means defining a cylindrical portion on said output shaft disposed about said cylindrical surface on said input shaft, means defining a receptacle slot in said cylindrical portion registerable with said axial groove, a cylindrical pawl disposed in said slot for rotation as a unit with said output shaft and for radial bodily movement relative thereto between an extended position wherein said pawl is situated in said slot and in said groove thereby to directly couple said input and said output shafts for unitary ratio torque transfer and a retracted position wherein said pawl is situated in said slot remote from said groove thereby to permit relative angular movement between said input and said output shafts, spring means urging said pawl toward the extended position thereof, one of said cam surfaces being engageable on said pawl in the extended position thereof and operative in response to application of torque exceeding a predetermined minimum magnitude to said input shaft to cam said pawl from the extended to the retracted position thereof against said spring means, a pair of coupling elements disposed on said output shaft on opposite sides of said pawl and adapted to be engaged by the latter during movement thereof from the extended to the retracted position and bodily moved laterally relative thereto, second cam means associated with said coupling elements and engageable on said coupling elements during lateral movement thereof to impart thereto an axial component of bodily motion, lock means disposed on said one rigidly connectable planetary gear set element and adapted for axial bodily movement between an unlocked position and a locked position rigidly connecting said one element to said one of said housing and said input shaft, and means connecting said coupling elements to said lock means responsive to the axial motion component of said coupling elements to move said lock means from the unlocked to the locked position thereof.

4. A torque transmission mechanism adapted to normally effect torque transfer between a rotating input shaft and a rotating output shaft at a unitary transmission ratio and to automatically shift to a higher transmission ratio in response to torque input exceeding a predetermined minimum magnitude comprising in combination, a stationary housing rotatably supporting said input and said output shafts in axial alignment, an input sun gear rigidly attached to said input shaft, a planet carrier rotatably disposed in said housing, a set of input planet gears rotatably supported on said planet carrier and meshingly engaging said input sun gear, a ring gear rotatably disposed in said housing and meshingly engaging each of said input planet gears, a set of output planet gears rotatably supported on said carrier and meshingly engaging said ring gear, an output sun gear rigidly attached to said output shaft and meshingly engaging each of said output planet gears, means defining a cylindrical bearing surface on said input shaft having an axial groove therein the opposite sides of which define a pair of cam surfaces, means defining a cylindrical portion on said output shaft disposed about said cylindrical surface on said input shaft, means defining a receptacle slot in said cylindrical portion registerable with said axial groove, a cylindrical pawl disposed in said slot for rotation as a unit with said output shaft and for radial bodily movement relative thereto between an extended position wherein said pawl is situated in said slot and in said groove thereby to directly couple said input and said output shafts for unitary ratio torque transfer and a retracted position wherein said pawl is situated in said slot remote from said groove thereby to permit relative angular movement between said input and said output shafts, a plurality of spherical rolling elements disposed around a portion of said output shaft on opposite sides of said pawl, each of said rolling elements being in contact with the ones of said plurality of rolling elements on opposite sides thereof and the two of said rolling elements situated adjacent opposite sides of said pawl being engageable by the latter during movement thereof from the extended toward the retracted position thereby to effect lateral movement of each of said rolling elements relative to said pawl, cam means on said output shaft engageable on each of said rolling elements during lateral movement thereof to impart thereto an axial component of bodily movement, a plurality of lock pins disposed on said planet carrier for axial bodily movement relative thereto between a locked position engaging an abutment on said housing thereby to lock said planet carrier against rotation relative to said housing and a retracted position remote from said housing permitting rotation of said planet carrier, spring means disposed between each of said lock pins and said planet carrier biasing said lock pins toward the unlocked position thereof, and means establishing a connection between said lock pins and said rolling elements whereby the axial motion component of the latter effects movement of said lock pins from the unlocked to the locked position and the bias imposed on said lock pins urges said rolling elements to the positions thereof corresponding to the extended position of said pawl so that the latter is thereby resiliently biased toward the extended position thereof, one of said cam surfaces of said groove being operable to cam said pawl from the extended to the retracted position thereof in response to the application of torque exceeding a predetermined minimum magnitude to said input shaft thereby to move said lock pins from the unlocked to the locked position thereof so that torque is transferred from said input shaft to said output shaft through said sun gears and said ring gears and said planet gears at a transmission ratio exceeding unity.

* * * * *